Patented Aug. 1, 1933

1,920,828

UNITED STATES PATENT OFFICE 1,920,828

AMINO-XYLENOLS AND PROCESS OF PRODUCING SAME

Max Wyler, Manchester, England, assignor to Imperial Chemical Industries Limited, a Corporation of Great Britain No Drawing. Application June 24, 1930, Serial No. 463,568, and in Great Britain June 27, 1929

7 Claims. (Cl. 260—130.5)

This invention relates to the manufacture of the aminoxylenol ($OH:NH_2:CH_3:CH_3=1:3:2:4$), 3-amino-2:4-xylenol-1, corresponding to the formula

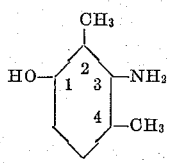

or of its acyl derivatives. These substances, hitherto unknown, are valuable intermediates for the manufacture of dyestuffs.

The process of manufacture in accordance with this invention involves nitrating an acyl-m-2-xylidine, e.g. acetyl-m-2-xylidine, reducing the nitro compound so obtained, 1-nitro-3 amino-2:4-xylene, to the corresponding mono-acyl-m-xylylene-2:4-diamine, converting the latter into a diazonium compound by treatment with nitrous acid, and treating the diazonium compound with hot dilute sulphuric acid. The acylamino-xylenol so obtained is then subjected to hydrolysis.

Hitherto, in such nitration processes as that which I have described, the acylamino group has been found to influence the course of the nitration to a considerable degree, and it could not be foreseen that in this case nitration would take place in such a way as to give a single product, and one in which the nitro group would occupy an ortho position relative to one of the methyl groups.

The following example illustrates the invention, the parts being by weight.

Example 163 parts of acetyl-m-xylidine, believed to have the formula

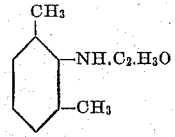

are dissolved below 10° C. in 1,000 parts sulphuric acid (85%) and nitrated below 5° C. with mixed acid containing 66 parts nitric acid (100%). After 12 hours stirring at 20° C., the nitration mixture is poured into 5,000 parts ice water, the resulting precipitate filtered off and washed until neutral. The nitro body is reduced at 80° C. with 250 parts iron filings, 15 parts acetic acid (100%) and 1,000 parts water, the whole made alkaline with soda ash and filtered boiling hot. The filtrate is saturated with common salt, allowed to cool and the acetamino xylidine which crystallizes out filtered off. It is dissolved in a mixture of 800 parts water and 240 parts sulphuric acid (95%) whereupon diazotization is effected at 0° C. by the gradual addition of a solution of 56 parts sodium nitrite. The diazo solution is slowly heated to 90° C. while agitating. After the evolution of nitrogen has ceased the liquor is allowed to cool and stirring is continued at ordinary temperature until no more acetamino xylenol crystallizes out. It may be purified by recrystallization from water to yield crystals melting at 191° C.

To split off the acetyl group the body is boiled under reflux for 2 hours with four times its weight of 50% sulphuric acid. The whole is then diluted and neutralized when the amino xylenol separates out in crystalline form. It may be purified by recrystallization from benzol to yield crystals which melt at 170° C.

It will be obvious from the above description that the process of the invention is not limited to the treatment of the particular starting compound disclosed in the example or to the exact conditions therein specified. Thus, instead of acetyl-m-xylidine, other acyl-xylidines may be employed.

As many apparent and widely different embodiments of this invention may be made without departing from the spirit thereof, it is to be understood that I do not limit myself to the foregoing examples or description except as indicated in the following claims.

I claim:

1. In the process of preparing an amino-xylenol, the steps of nitrating an N-acyl-xylidine compound to introduce a nitro group, reducing the resulting nitro group to an amino group to obtain an acyl-xylylene-diamine, and replacing the amino group so formed with a hydroxyl group.

2. The process of preparing an amino-xylenol which comprises nitrating an N-acyl-xylidine compound, reducing the resulting nitro compound, diazotizing the resulting acyl-xylylene-diamine, replacing the diazo group with a hydroxy, and removing the acyl group by hydrolysis.

3. The process of preparing 3-amino-2:4-xylenol-1 which comprises nitrating an N-acyl-2-xylidine to introduce a nitro group, reducing the resulting nitro group to an amino group, replacing the amino group with a hydroxyl group by diazotizing and heating in the presence of weak sulphuric acid, and thereafter subjecting the resulting acyl-amino-xylenol to hydrolysis to split off the acyl group.

4. The process of claim 3 wherein the compound nitrated is N-acetyl-m-xylidine.

5. The process of preparing 3-amino-2:4-xylenol-1 which comprises treating N-acetyl-m-xylidine with nitric acid at a temperature below 5° C. to introduce a nitro group, reducing the resulting nitro group to obtain acetamino xylidine, diazotizing and heating to about 90° C. in the presence of dilute sulphuric acid until evolution of nitrogen ceases and thereafter boiling with sulphuric acid of about 50% concentration to effect hydrolysis and split off the acetyl group.

6. As a new compound, a product having the formula

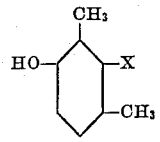

wherein X is either an amino or an acetylamino group.

7. As a new compound, a product having the formula

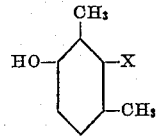

wherein X is an amino group.

MAX WYLER.